US010218714B2

(12) United States Patent
Henocque

(10) Patent No.: US 10,218,714 B2
(45) Date of Patent: Feb. 26, 2019

(54) METHOD FOR CHECKING THE INTEGRITY OF A DIGITAL DATA BLOCK

(71) Applicants: UNIVERSITÉ D'AIX-MARSEILLE, Marseilles (FR); CENTRE NATIONAL DE LA RECHERCHE SCIENTIFIQUE, Paris (FR)

(72) Inventor: Laurent Henocque, Marseilles (FR)

(73) Assignees: UNIVERSITE D'AIX-MARSEILLE, Marseilles (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 82 days.

(21) Appl. No.: 14/761,499

(22) PCT Filed: Jan. 15, 2014

(86) PCT No.: PCT/FR2014/050073
§ 371 (c)(1),
(2) Date: Jul. 16, 2015

(87) PCT Pub. No.: WO2014/114861
PCT Pub. Date: Jul. 31, 2014

(65) Prior Publication Data
US 2015/0365426 A1 Dec. 17, 2015

(30) Foreign Application Priority Data
Jan. 22, 2013 (FR) ...................................... 13 50549

(51) Int. Cl.
H04L 29/06 (2006.01)
H04L 9/00 (2006.01)
(Continued)

(52) U.S. Cl.
CPC .............. *H04L 63/123* (2013.01); *H04L 9/00* (2013.01); *H04L 9/14* (2013.01); *H04L 9/3236* (2013.01);
(Continued)

(58) Field of Classification Search
CPC ......... H04L 2209/68; H04L 9/00; H04L 9/14; H04L 9/3236; H04L 63/123; H04L 2209/24; H04L 2209/72; H04L 63/0428
See application file for complete search history.

(56) References Cited

U.S. PATENT DOCUMENTS 5,638,446 A * 6/1997 Rubin ..................... H04L 9/321
380/30
6,785,815 B1 * 8/2004 Serret-Avila .......... G06T 1/0071
348/E7.06
(Continued)

OTHER PUBLICATIONS

Apr. 8, 2014 International Search Report issued in International Patent Application No. PCT/FR2014/050073.
(Continued)

Primary Examiner — Tri M Tran
(74) Attorney, Agent, or Firm — Oliff PLC

(57) ABSTRACT

The present invention relates to methods for verifying the integrity of data blocks and for accessing the blocks and relates more particularly to a method for verifying the integrity of a digital data block, the method comprising steps of: searching for a digital fingerprint in a data block of a reference point, calculating a digital fingerprint by applying a fingerprint calculation function to the data block, the fingerprint calculated having a value which depends on each of the bits of the data block excluding the bits of a fingerprint found in the data block, and verifying the fingerprint found in the data block by comparing it with the fingerprint calculated.

23 Claims, 7 Drawing Sheets

(51) Int. Cl.
*H04L 9/14* (2006.01)
*H04L 9/32* (2006.01)

(52) U.S. Cl.
CPC ...... *H04L 63/0428* (2013.01); *H04L 2209/24* (2013.01); *H04L 2209/68* (2013.01); *H04L 2209/72* (2013.01)

(56) References Cited

U.S. PATENT DOCUMENTS

| | | |
|---|---|---|
| 7,774,320 B1 | 8/2010 | Day et al. |
| 2002/0194209 A1* | 12/2002 | Bolosky ............ G06F 17/30097 |
| 2003/0018688 A1 | 1/2003 | Sternin |
| 2005/0283489 A1 | 12/2005 | Shiozawa et al. |
| 2006/0047967 A1* | 3/2006 | Akhan ..................... H04N 5/76 |
| | | 713/176 |
| 2008/0222414 A1 | 9/2008 | Wang et al. |
| 2009/0171878 A1 | 7/2009 | Zeng |
| 2009/0282255 A1* | 11/2009 | Sherkin ................. H04L 9/3236 |
| | | 713/176 |
| 2010/0023507 A1* | 1/2010 | Kim .................... G06F 17/3025 |
| | | 707/E17.03 |

OTHER PUBLICATIONS

Zhu et al.; "Cooperative Provable Data Possession for Integrity Verification in Multicloud Storage," IEEE Transactions on Parallel and Distributed Systems; vol. 23; No. 12; Dec. 2012; pp. 2231-2244.

Jul. 28, 2015 International Preliminary Report on Patentability issued in International Patent Application No. PCT/FR2014/050073.

ETSI TS 102 778-1, "Electronic Signatures and Infrastructures (ESI); PDF Advanced Electronic SIgnature Profiles; Part 1: PAdES Overview—a framework document for PAdES," vol. 1.1:1-20.

PDF 32000-1:2008, "Document management—Portable document format—Part 1: PDF 1.7," Chapter 12.8, p. 466.

* cited by examiner

METHOD FOR CHECKING THE INTEGRITY OF A DIGITAL DATA BLOCK

GENERAL TECHNICAL FIELD

The present invention relates in general to methods for verifying the integrity and authenticity of digital data blocks and for accessing these data blocks, whether the latter are distributed over a network or stored on a storing medium.

Definitions

In this description, the following terms and expressions shall have the following meanings.

"Data block" means any digital file or document or any part of such a file or document; the term "file" should not be understood as being limited to a file from a file management system.

"Metadata" of a data block does not mean content data of the block, but data relating to this content, or to another metadata. Therefore, this is meta-content, and not structure data specifying in particular the location, the nature of each piece of metadata and its possible structure.

"Digital fingerprint" of a data block means data produced by a function whereby it is possible to ensure the integrity of the data block, such that if a bit of the data block is modified, the digital fingerprint will be modified. This function may be a hashing function, but not necessarily. A digital fingerprint is sometimes referred to as hashing key, checksum, fingerprint, hash, message summary, digest or even cryptographic fingerprint.

"Digital signature" means a digital fingerprint ciphered using a private key of a pair of public/private keys and an asymmetric cryptographic program such as "pgp" (Pretty Good Privacy) or its free counterpart "gpg" (Gnu Privacy Guard). A digital signature makes it possible to ensure the integrity of a data block and to authenticate its signer, by analogy with the handwritten signature of a paper document. It shall be noted that a digital signature having the properties of a digital fingerprint can be obtained by applying an asymmetric ciphering program directly to the data block.

"Controlled insertion" or "inserted in a controlled manner" means an insertion of any data into a data block, at a location that the user can choose as freely as the type of data block in question permits. However, this does not preclude the choice of this location possibly being made by a program, or being standardized.

"Non-destructive insertion" or "inserted in a non-destructive manner" means an insertion of any data into a data block, performed without affecting the properties of the data block, i.e. it may be opened, displayed, printed, executed, etc. by the same tools as before this insertion.

State of the Art

In the context of data block integrity and authenticity, a two-fold problem arises, which involves knowing:
 how to reach these data blocks, and
 how to be certain that a data block found is the one searched for.

Currently, this two-fold problem is solved according to several modes. According to a first mode, the expected exact location of the data block, referred to as the data block address, is known. This address is either an access path to a file in the directories of a file management system (for example: C:\MesDocuments\test.txt), or an URL address (Uniform Resource Locator) indicating an access path to a page on the network (for example: html://un-site.com/documents/test.txt), and this access path can in particular be provided as a hypertext link in a Web page. According to this first mode, several cases arise, including the two cases below.

According to a first case, the data block is found at the known address as expected. It is then important to make sure that the data block found is the one searched for; for example, it is important to make sure that the data block found is true to a version of this block that we remember, or which we used and referenced in the past, or a version consulted by the possible issuer of the address.

According to a second case, the data block searched for is not found at the known address; this second case refers to the second mode presented below.

According to a second mode, the expected exact location of the data block is not known. However, we know one or more key words or sentence fragments, used in the name, address or content of the data block, which may have been indexed by an indexing engine so as to be used by a search engine (on a hard drive or on the internet) to find this data block. Indeed, the search for data blocks via an indexing engine or search engine has become a preferred tool and mode for working and accessing information. A significant part of modern-day cognitive activity relies on the ability to identify and aggregate documents discovered on the network or on a hard drive without knowing their name or their exact location. Document indexing is thus at the heart of the way information is used today, both on the internet and in a computer. Such indexing is most often done by means of key words coming from the natural language used in the document (for example, English words: "car rental New York"; words coming from a programming language: "getImage").

Furthermore, computers, tablets and smart phones today offer internal indexing engines making it possible to find documents, notes, contacts, messages, etc. by means of searches by key words. Similarly, virtual document storing devices ("Cloud") offer mechanisms for searching for documents by key words and by content indexing (Wuala, iCloud, etc.).

According to this second mode, a database is thus used to store the correspondences between the indexes and addresses of the data blocks, such that a search provides a list of data block addresses as result.

Again, several cases arise, including the four cases below. According to a first case, the address list is empty. A new search can always be launched with a different search criterion. However, if the name or address of the original data block has changed, it is possible that the access address for accessing the data block via a search for the original known indexes may be permanently lost. The result is that the data block cannot be found, although it may still exist.

According to a second case, the list comprises a significant set of data block addresses, and the search can be honed by adding indexes obtained for example by analyzing some of the data blocks found.

According to a third case, an address is selected at which a data block is found. It is then important to make sure that the data block found is the one searched for. Ensuring the authenticity of the document or data block found based only on its address and content is then impossible.

According to a fourth case, an address is selected in the list, but no data block is found at it, due for example to a difference that has occurred between the update's of the database and a change to the storing system. The next address in the list may then be selected, but there is no way of knowing whether the data block missing at the first address selected was not the only copy of the data block conforming exactly to the one searched for.

In addition to the few deficiencies of indexing or search engines noted above, present-day indexes remain insufficient to identify the data blocks relating to very specific activities or concepts, which requires the use of databases and specialized services. For example, posting an advertisement for a car, a tweet or a blog post, information relating to a flight, a comment on a photograph, a press article, stock exchange information, a research article, etc. cannot be done in the global melting pot of data accessible to indexing and search engines. For each of these usages, a dedicated Web site is necessary (for example topannonces, twitter, facebook, flickr, boursorama, citeseer, etc.). The precise semantics of data blocks can thus only currently be defined by Web sites dedicated to specific fields or services (for example a car rental Web site, a Web site listing on-line help for programming tools, a "dictionary" Web site listing ontologies for the semantic Web).

In addition, search engines give a presentation of results that is organized according to preference algorithms based in particular on a popularity calculation. In this context, it can be impossible to achieve relevant results for a given search if the latter are proposed at ranks very far from those of the first results.

To verify the identity or the authenticity of a data block almost for certain, one well-known method involves associating one or more digital fingerprints and/or signatures with it. However, this has many disadvantages as these verifying operations require downloading, in addition to the actual data block, various digital fingerprints such as in particular, "crc", "md5", "sha1", etc., or various digital signatures ("pgp", "gpg"), then using as many tools (for example, "shasum", "md5sum", "gpg", openssl, etc.) with various parameters, to perform these checks very often manually. To do so, the current solution involves publishing files of fingerprints and/or of signatures independent of the data blocks they certify, or creating Web pages containing the signatures in readable text, the latter having to be copied by the user, then pasted via a complex software command. Due to the diversity of the tools and parameters, this process cannot be universally automated.

The search for data blocks is not only a problem of human usage, but also depends on automation that the present-day situation largely prevents. For example, in the framework of the semantic Web, it is important to characterize for certain an ontology and its instances that must be transformed, transmitted between Web services, etc.

Automatic code-generating tools (compilers, makefiles) are in some cases designed so as to automatically verify that the data blocks used are indeed what they purport to be. The present-day approach involves creating a file containing the fingerprints of the source program files and archives, then ensuring that the code generating tool checks the validity of the fingerprints with a standard cryptographic tool ("md5sum", "shasum"). This process cannot be generalized to the internet and is only possible in a very limited range of cases, for example for the validation and compilation of Unix program blocks (or packages).

Furthermore, the "gpg" or "pgp" tools have a signature mode referred to as "clearsign", whereby a data block is inserted between or surrounded by two text zones containing tags or between two sections of metadata, jointly with a signature. In this case, the signature is inserted into the data block. The data block is thus modified in a destructive manner. Indeed, the text zones or the sections of metadata create an interference with the usual tools for using the data block, rendering this use impossible or significantly altered. For example, if the original data block is a binary file, a program or a source code, the insertion of a signature renders it unusable, inexecutable or non-compilable. If the original data block (before insertion of the signature) is a text file or an HTML page, its display is significantly altered. As a result, the present-day technology of inserting "pgp" signatures in plain text with the "clearsign" option does not respect the semantics of documents, which can then become unusable by their usual tools.

The present-day situation thus poses a large number of problems, which the present invention attempts to solve in a unified manner. One solution is more particularly proposed which notably:

guarantees that a data block found is the one searched for, identifies the author of a data block for certain, provides protection against losing access to a data block due to a change of its name or address, permits access to a set of data blocks relating to a precise concept, this set being limited solely to the relevant results, without requiring a dedicated Web site, allows data blocks written in distinct languages to be part of an identical concept, characterizes for certain the ontologies and their instances used in the context of the semantic Web, and/or automates the verification of fingerprints and signatures attached to a data block.

Currently, a fingerprint or signature cannot be inserted into a data block without its value being modified. A data block cannot thus contain its own valid fingerprints or signatures. A fingerprint or signature or a part of the latter cannot therefore be used both as identification or authentication element and as a search criterion for searching for a data block indexed by search engines. Indeed, even though a search based on a fingerprint or signature may enable the address of a Web page proposing links to data blocks to be found, it is not possible to immediately determine the data block susceptible of corresponding to this signature. Moreover, once a data block is found, verifying that this block conforms to the signature is a tedious operation.

These difficulties are due to the fact that the information necessary to identify or authenticate a data block must remain external to this block. Each identification or authentication data must be provided separately (in an independent file or in a database), and in the absence of this information, nothing else makes it possible to certify that the data block is indeed what it purports to be. In addition, the information provided, if any, in digital files separated from the data block itself can thus be corrupted by a third party or fraudulently accessible by means of tricks.

In addition to the need expressed above for a solution for inserting a fingerprint or a signature into a data block in a controlled and possibly non-destructive manner, there is thus a real need to develop a software program capable of automatically verifying and/or updating this fingerprint or signature and more generally metadata of a data block. It may be desirable for this software to be capable of automatically exploiting these metadata to perform cascade (or recursive) validations of a plurality of data blocks, or even capable of exploiting, via its own source code, its own metadata and/or those of associated programs.

Some embodiments relate to a method for verifying the integrity of a digital data block, the method comprising steps of: searching for a digital fingerprint in a first data block, by means of a first reference point, calculating a first digital fingerprint by applying a fingerprint calculation function to the first data block, the first fingerprint calculated having a value which depends on each of the bits of the first data block excluding the bits of a fingerprint found in the first data block, and verifying the fingerprint found in the first data block by comparing it with the first fingerprint calculated.

According to one embodiment, the method comprises steps of: searching for a fingerprint in a second data block, by means of the first reference point, calculating a second digital fingerprint by applying the fingerprint calculation function to the second data block, the second fingerprint calculated having a value which depends on each of the bits of the second modified data block excluding the bits of the fingerprint found in the second data block, and inserting the second fingerprint into the second data block by replacing the fingerprint found in the second data block.

According to one embodiment, the application of the fingerprint calculation function to the first or second data block is preceded by a step of removing the fingerprint found in the first or second data block.

According to one embodiment, the method comprises steps of generating a verifiable data block, involving: searching for a location for inserting a fingerprint in an initial data block, by means of a second reference point, calculating a third digital fingerprint by applying the fingerprint calculation function to the initial data block, the third fingerprint calculated having a value which depends on each of the bits of the initial data block, and generating a verifiable data block by inserting the third fingerprint at the insertion location found in the initial data block.

According to one embodiment, the calculation of each fingerprint comprises a step of inserting a predefined data into the data block before applying the fingerprint calculation function to the data block.

According to one embodiment, the calculation and insertion of the third fingerprint are performed several times on a same data block without removing the fingerprints already inserted into the data block.

According to one embodiment, the method comprises a step of reading a piece of information useful to locate and/or to calculate a fingerprint, contained in the digital data block containing the fingerprint.

According to one embodiment, one of the data blocks contains a piece of information making it possible to build at least partly a fingerprint present in another data block.

According to one embodiment, one of the data blocks comprises metadata eligible for removal and metadata not eligible for removal, and a metadata identifying the data block, eligible for removal into which a fingerprint of the data block is inserted.

According to one embodiment, the metadata of a data block that are eligible for removal comprise an invariable part and a variable part, only the variable part being removed during the removal step, the fingerprint of the data block identification metadata being inserted into the variable part of the identification metadata.

According to one embodiment, at least one part of the fingerprint inserted into each data block is used by an indexing engine or as a search key word by a search engine.

According to one embodiment, one of the data blocks is at least one part of an executable code file of a program, and the fingerprint is inserted into the data block at a location enabling the program to exploit the fingerprint of the data block.

According to one embodiment, the insertion of each fingerprint into a data block is done at a location in the data block chosen so as not to modify the expected conditions of use of the data block by a software program.

According to one embodiment, each fingerprint inserted into a data block is a digital signature generated by an asymmetric cryptographic calculation using a private key of a pair of public/private keys, and the fingerprint verification comprises a step of deciphering the digital signature found in the data block, with the public key of the pair of public/private keys.

Some embodiments also relate to a computer program product comprising portions of program file saved on a computer-readable medium, to implement the steps of the method previously defined.

According to one embodiment, at least one part of the program is included in one of the data blocks.

Some embodiments also relate to a set of files wherein each file contains an identification fingerprint identifying the file, the identification fingerprint having a value which depends on each of the bits of the file excluding the bits of the identification fingerprint, at least one of the files comprising a reference fingerprint formed from an identification fingerprint of another file from the set.

According to one embodiment, the reference fingerprint contained in one of the files from the set is obtained by reversibly modifying one of the identification fingerprints identifying the files from the set, to distinguish the reference fingerprint from the identification fingerprints.

According to one embodiment, the set of files comprises a link file containing two reference fingerprints corresponding to the identification fingerprints identifying two other files from the set, to establish a link between the two other files.

DESCRIPTION OF THE PRESENT INVENTION

From the examples below provided as illustration, and illustrated by the appended figures, those skilled in the art will understand that other advantages are possible.

BRIEF DESCRIPTION OF THE FIGURES

FIG. 1 represents steps of a method 1 comprising, as applicable, a phase of inserting (a) 110, 114, 116 a fingerprint into a digital data block, a phase of verifying (b) 100, 102, 103 this fingerprint, and a phase of updating (c) 104, 105, 106, 108 this fingerprint, according to one embodiment.

FIG. 2 represents a data block 3, 4 before, during and after the insertion of a fingerprint 2 into the block. The insertion of a fingerprint into a data block comprises the following steps:
- searching 110 by means of a reference point 7 for a location in the data block 3, where a fingerprint can be inserted in a non-destructive manner,
- calculating 114 the fingerprint from the data block 3, the calculated fingerprint having a value which depends on each of the bits of the data block 3, and
- inserting 116 into the data block 3 the fingerprint 2 (equal to "5351220" in the example in FIG. 2) calculated in step 114 to obtain a data block 4 identifiable by its fingerprint 2.

The fingerprint may be inserted for example, into a program comment, into a section of the data block intended to receive plain text metadata (pdf, jpg), or at the end of a binary file (zip, exe).

By enabling a fingerprint to be positioned in the data block under the control of the program/user, the method 1 preserves the semantics of the data block.

The fingerprint 2 is thus properly contained in the data block 4. However, present-day technology does not enable a fingerprint to be inserted or modified, into or in a data block, without causing any change of value of the fingerprint calculated from the data block. In this context, the method according to its steps of insertion 110, 114 and 116 advantageously enables a fingerprint to be inserted into the data block in question, while defining a stable and thus reproducible standard for modifying the data block whereby the original value of the data block can be found via a step of removing the fingerprint. Therefore, thanks to this modification, it is possible to find again the value of the data block from which the fingerprint is supposed to have been calculated. It shall be noted that this modification is independent of a format of the data block or of technical choices made by the designers of a digital format.

In addition, the user of the data block 4 can freely choose the point of insertion of the fingerprint 2, which gives it total control over the integrity of the data block 4 thus instrumented, and enables it to choose the function this fingerprint 2 will have in the data block 4. For example, if the data block 4 is a program, the fingerprint may be a string of characters assigned to a variable of the program, or inserted as a program comment, etc.

It shall further be noted that for certain formats of binary documents, the insertion (a) can be done into a text zone present in plain language in the final document if we want to benefit from the advantages of the invention relating to indexing.

Figure 1:
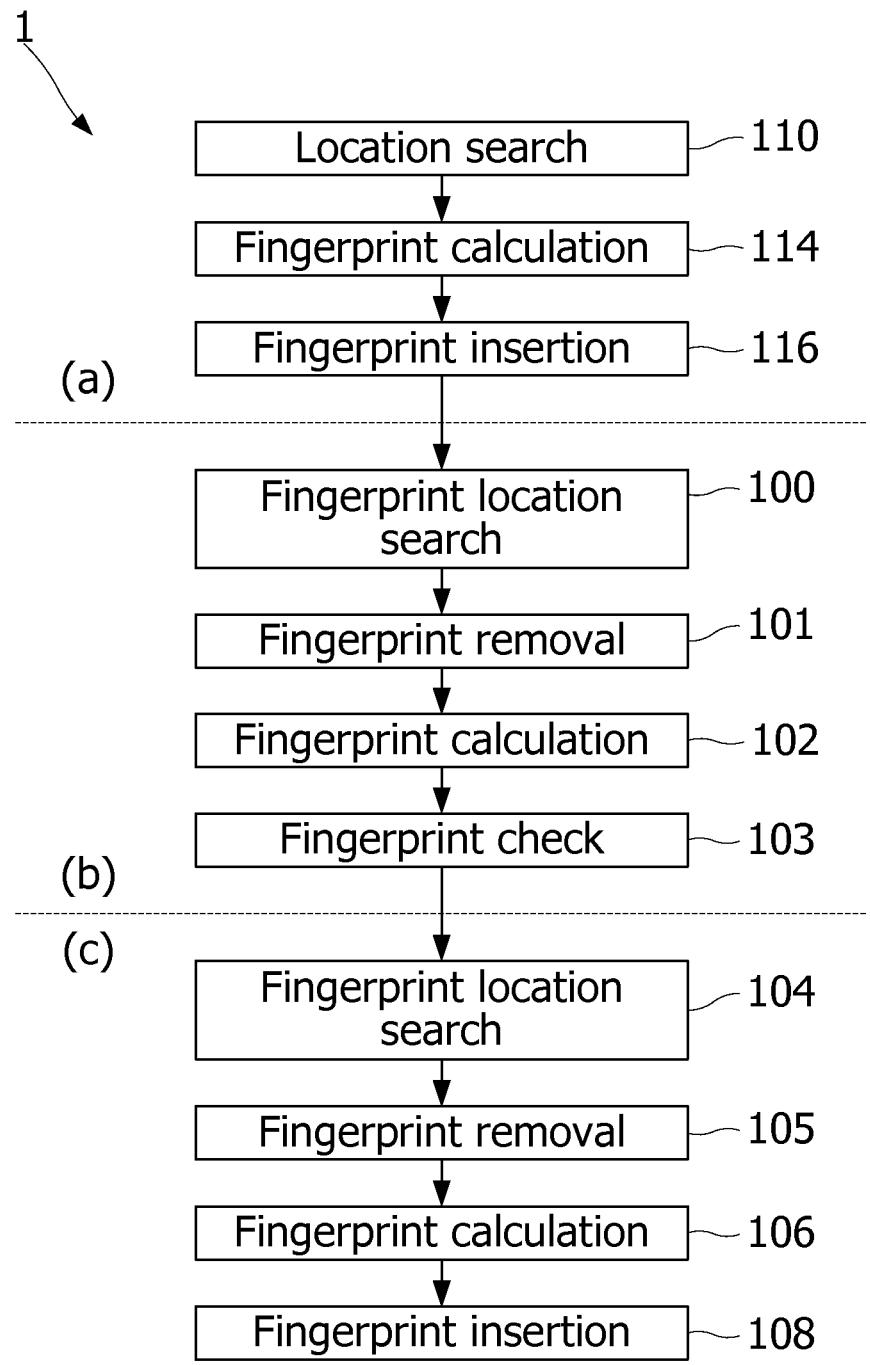
FIG. 1 represents steps of a method comprising, as applicable, a phase of inserting (a), a phase of verifying (b) and a phase of updating (c) a fingerprint in a digital data block, according to one embodiment.
Figure 2:
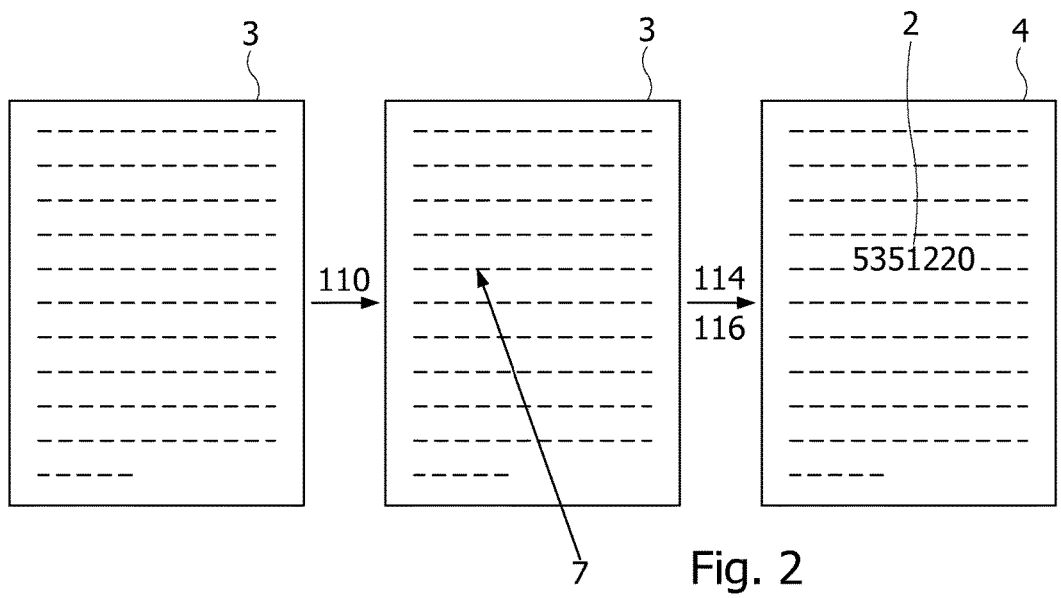
FIG. 2 schematically represents a data block at different steps of the insertion phase (a).
Figure 3:
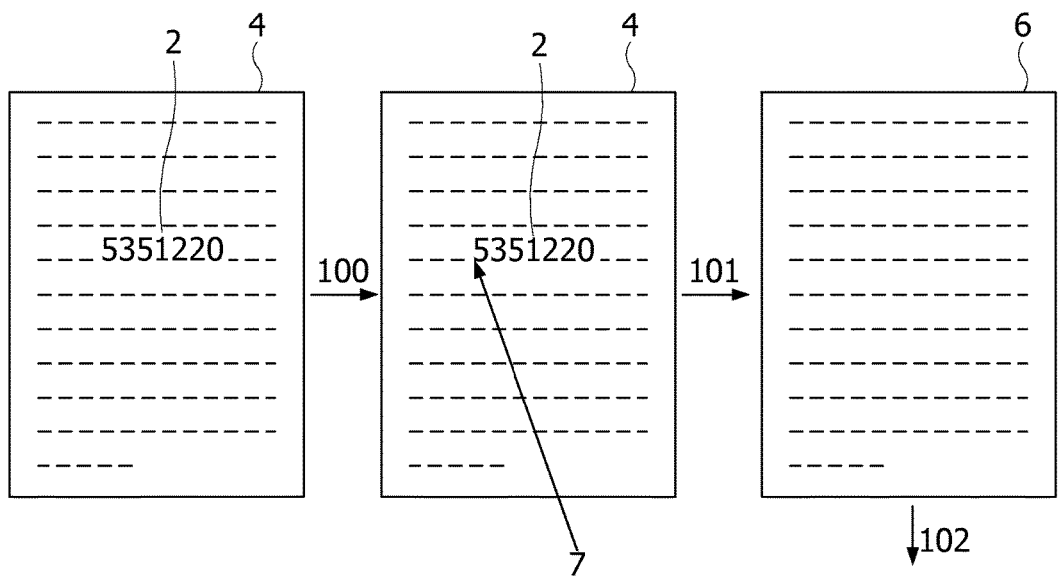
FIG. 3 schematically represents the data block at different steps of the verification phase (b).

FIG. 3 represents the data block before and during a data block fingerprint verification. As shown by FIGS. 1 and 3, the verification of the data block comprises the following steps of:
- searching 100 for a digital fingerprint 2 in the data block, by means of a reference point 7,
- generating 101 a modified data block 6 by removing from the data block the fingerprint 2 found in the data block,
- calculating 102 a digital fingerprint by applying the fingerprint calculation function to the modified data block 6, the calculated fingerprint having a value which depends on each of the bits of the modified data block 6, and
- verifying 103 the fingerprint 2 found (equal to "5351220" in the example in FIG. 3) in the data block by comparing it with the fingerprint calculated.

Therefore, the verification of the data block involves more particularly removing 101 the fingerprint 2 from the data block 4, to first obtain a modified data block 6. This modified data block 6 may be only temporary. Indeed, it simply needs to be kept to implement the next step of method 1 which involves calculating 102 the fingerprint from the modified data block 6 obtained during the removal step 101. The verification step 103 involves comparing the fingerprint found in the data block in step 100 with the fingerprint calculated in step 102.

Figure 4:
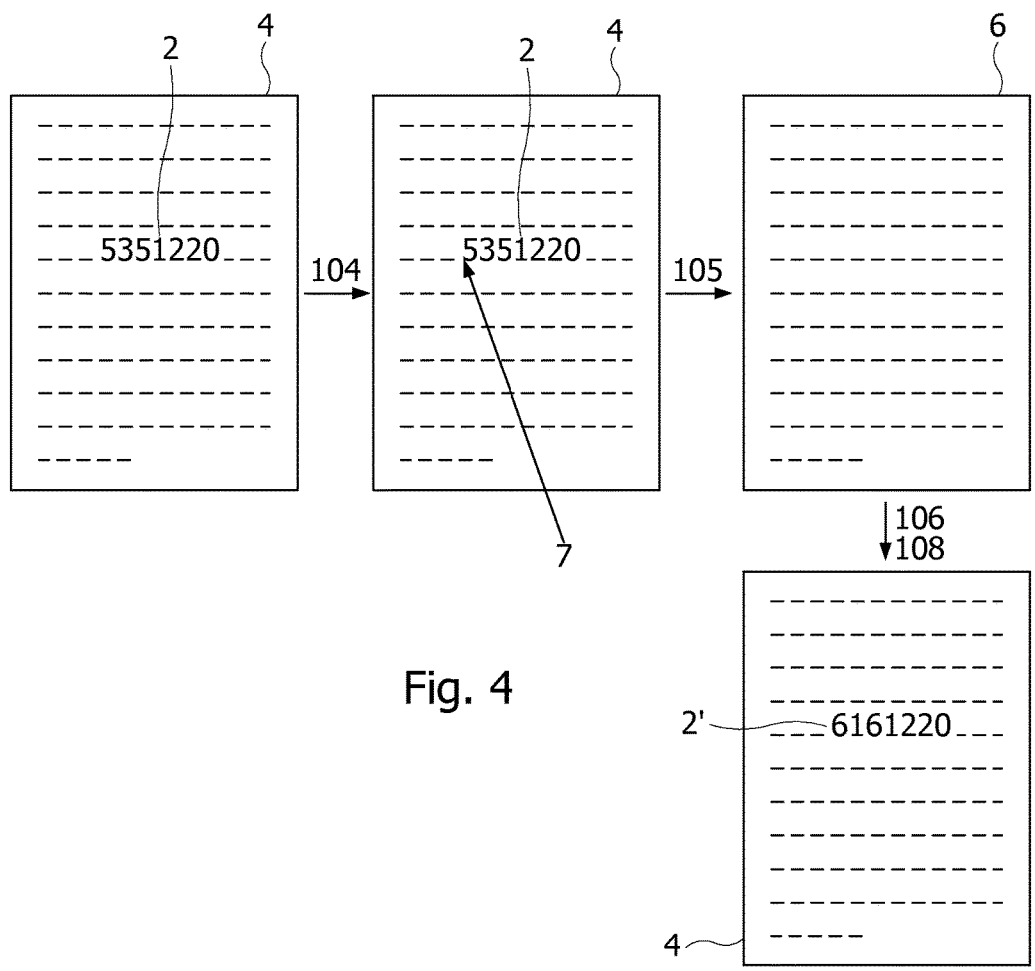
FIG. 4 schematically represents the data block at different steps of the updating phase (c).

FIG. 4 represents the data block before and during an update of the fingerprint of a data block. As shown on FIGS. 1 and 4, the verification method 1 may further comprise the following steps of:
- searching 104 for a fingerprint 2 in the data block 4, by means of the reference point 7,
- generating 105 a modified data block 6 by removing from the data block 4 the fingerprint 2 (equal to "5351220" in the example in FIG. 4) found in step 104,
- calculating 106 a digital fingerprint 2' by applying the fingerprint calculation function to the modified data block 6, the calculated fingerprint having a value which depends on each of the bits of the modified data block, and
- inserting 108 the calculated fingerprint 2' (equal to "6161220" in the example in FIG. 4) into the modified data block 6 at the location of the fingerprint removed from the data block.

The method thus enables the fingerprint (2 replaced with 2') of a data block to be updated in particular when the content of the data block has been modified.

The verification step 103 of the method 1 enables the user to be protected against any modification of a data block 4, or at least to detect any modification of a data block 4 by comparing the fingerprint 2 contained in the data block, with the fingerprint calculated from the modified data block 6. Therefore, the method 1 corresponds to a method for identifying, for verifying the integrity and for authenticating a data block into which a fingerprint has been inserted in a controlled and possibly non-destructive manner. With this method, by removing the fingerprint contained in the data block, the value of the data block from which the fingerprint is supposed to have been calculated can be found again and it is then possible to verify whether this assumption is true or false by comparing the removed fingerprint with the fingerprint calculated from the modified data block 6 obtained following the removal. If the comparison is true, the data block 4 has not been modified since the fingerprint 2 was inserted. If the comparison is false, the data block 4 is corrupted or has merely been modified.

Figure 5:
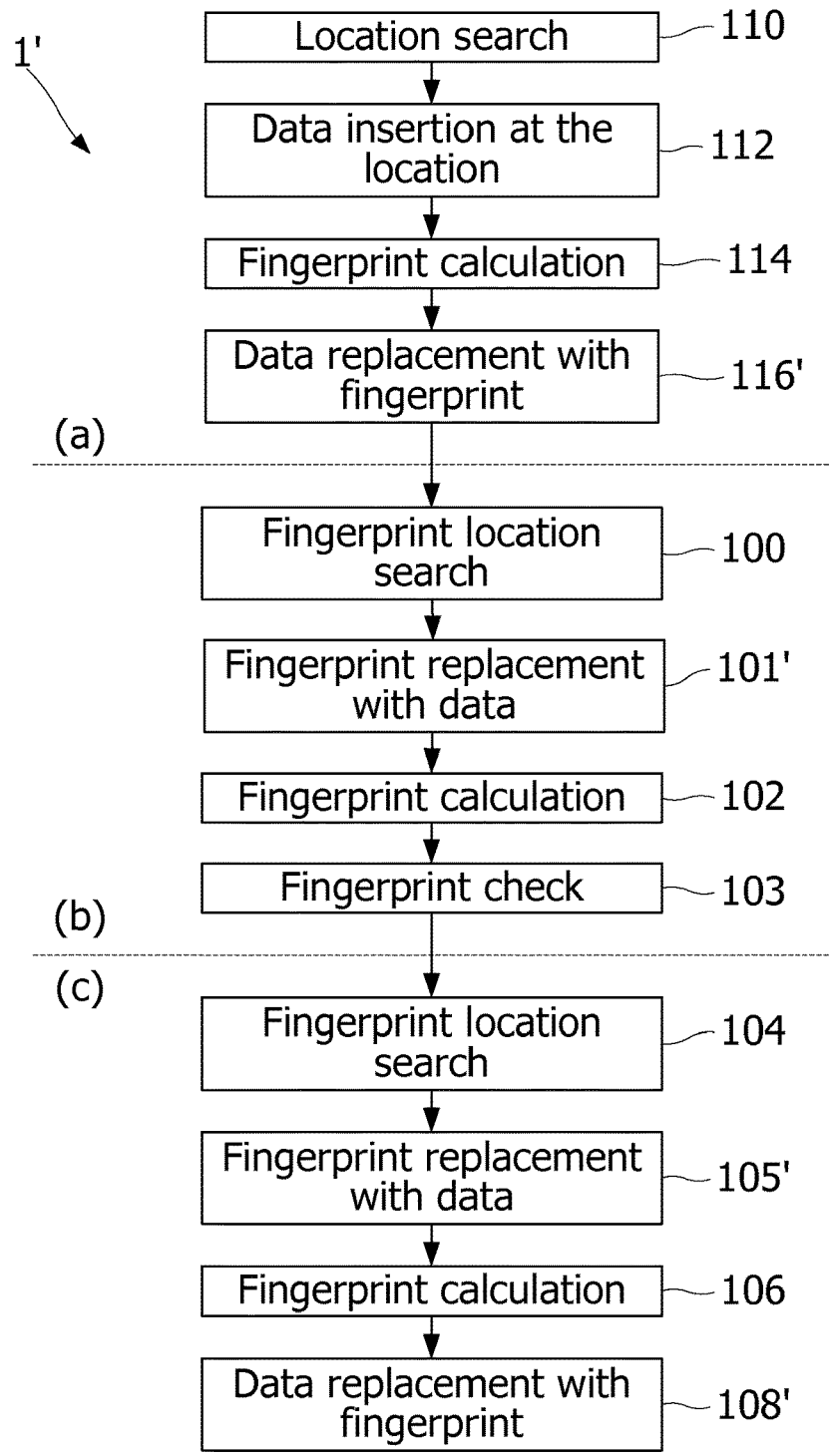
FIG. 5 represents steps of a method comprising, as applicable, a phase of inserting (a'), a phase of verifying (b') and a phase of updating (c') a fingerprint in a digital data block, according to another embodiment.
Figure 6:
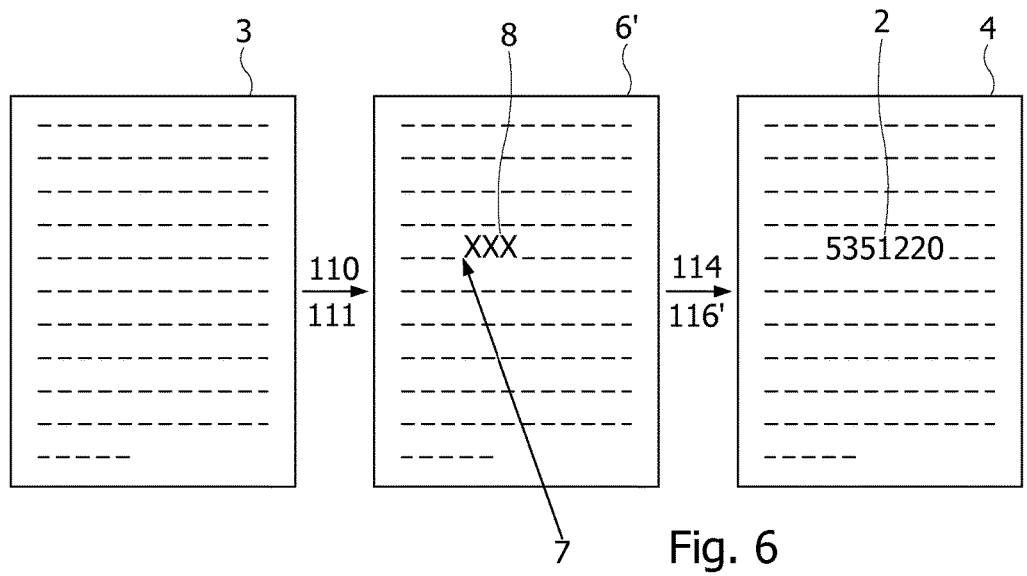
FIG. 6 schematically represents a data block at different steps of the insertion phase (a').
Figure 7:
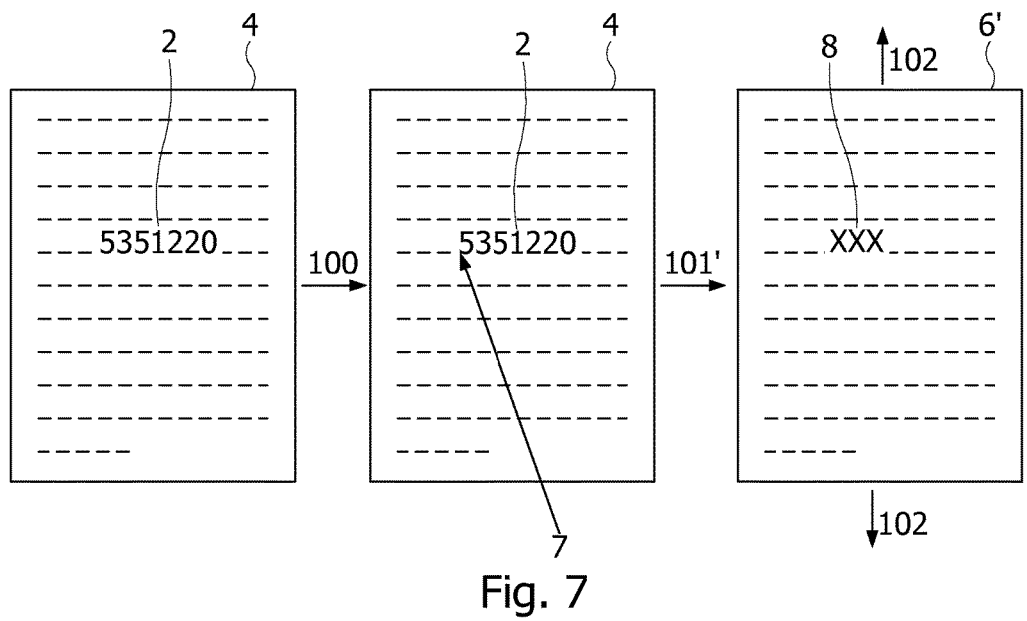
FIG. 7 schematically represents the data block at different steps of the verification phase (b').
Figure 8:
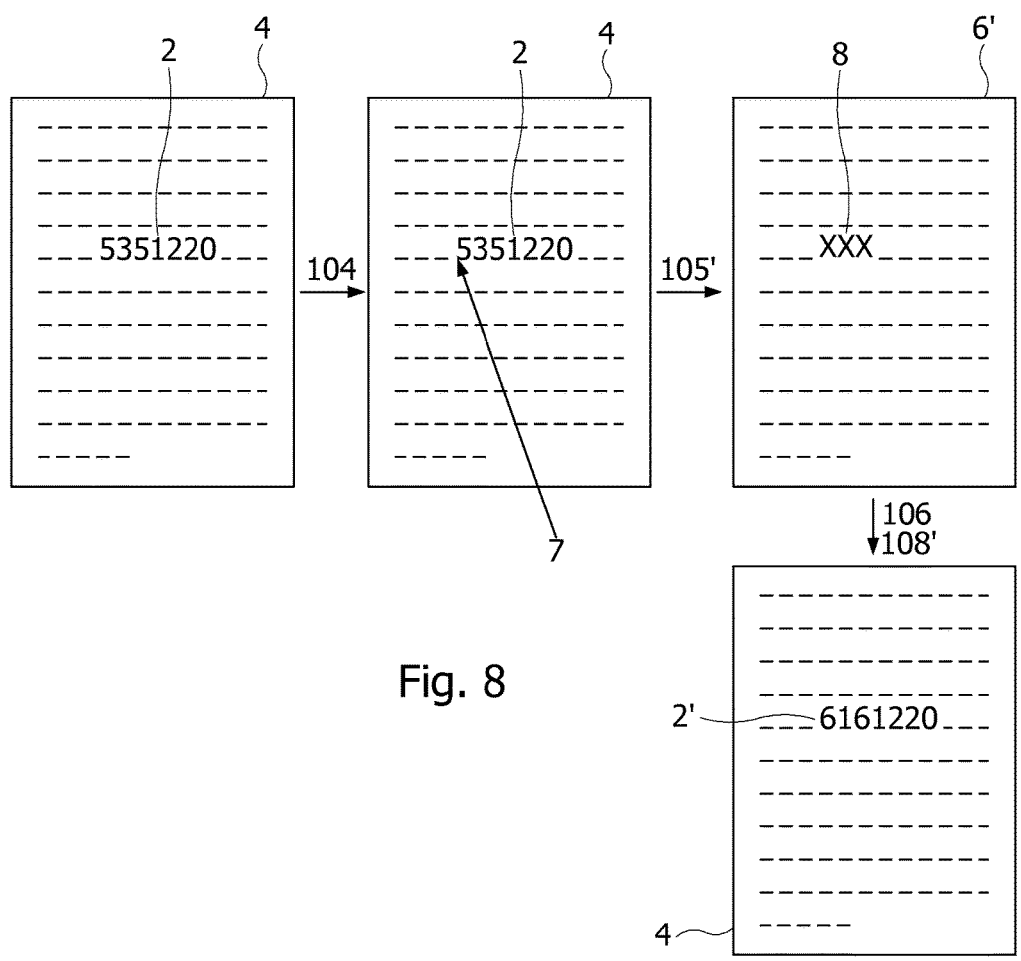
FIG. 8 schematically represents the data block at different steps of the updating phase (c').

It shall be noted that the steps 102, 106, 114 of calculating the fingerprint may be preceded by a step of inserting a predefined data at the fingerprint insertion location found in steps 100, 104 and 110. Therefore, FIGS. 5 to 8 respectively differ from FIGS. 1 to 4, in that such a predefined data 8 is inserted into the data block before calculating the fingerprint. The method 1' in FIG. 5 differs from the method 1 in FIG. 1 in that the steps of removing the fingerprint 101, 105 are replaced with steps of replacing 101', 105' the fingerprint 2 found with the data 8 (or are followed by a step of inserting the data 8), the step 114 of calculating the fingerprint is preceded by a step 112 of inserting the data 8 at the location found in step 110, and the steps 108, 116 of inserting the calculated fingerprint are replaced with steps 108', 116' of replacing the data 8 in the modified data block 6' with the calculated fingerprint 2, 2'. Therefore, the modified data block 6' differs from the data block 6 in that it comprises the data 8 at the location of the fingerprint 2. The steps 101, 105' and 111' generate the data block 6' containing the data 8 at the fingerprint insertion location. It shall be noted that the removal of the fingerprint, as performed in steps 101 and 105 can be done by replacing the removed data with another data. It shall also be noted that the data 8 is not necessarily inserted into the data block at the position of the fingerprint, but may be inserted at another location of the data block.

It is also possible to consider inserting the same identification fingerprint identifying a data block several times into the latter. In this case, the reference point 7 can be used to find one of the fingerprints identifying the data block, and the fingerprint found may then be used to search for the other data block identification fingerprints. The removal 101, 105 or replacement 101', 105' steps are then performed for all the identification fingerprints inserted into the data block.

Depending on its type, the fingerprint may in itself constitute the reference point 7 enabling it to be located in the data block 4. This is for example the case when the metadata has a sufficiently specific format to be able to be located in the data block by means of a regular expression. For example, when the metadata is a fingerprint "sha1" taking a hexadecimal format of 40 characters (for example "313579888a840dec517a3908d57427299ec1f5f7"), it can be located in the data block by means of the regular expression "[0-9a-f]{40}".

The fingerprint 2 may be inserted into the data block 4 as or in a metadata used to identify the data block. When the fingerprint 2 or the metadata which contains it does not in itself enable the fingerprint to be located, which is particularly the case when the fingerprint or the metadata can be confused with the normal content of the data block, the reference point 7 may be inserted into the data block 4 or the metadata. Therefore, the reference point 7 may be a specific format, a specific character string known to appear in the metadata identifying a data block, regular separators, etc. The format may be implicitly known since it is defined by default, for example, a metadata made up of the 20 first characters of a fingerprint "sha1", with a separating hyphen every 5 characters. The reference point 7 is not necessarily at the location of the fingerprint, but may indicate this location, for example in relation to the start or end of the data block, or in relation to the position of the reference point in the data block. Therefore, the reference point 7 may be associated with information useful for locating the fingerprint, such as a position defined in relation to the reference point 7, or in relation to the start or end of the data block.

More particularly, a chosen or standardized language element may be inserted into the data block 4 to designate, within the very data block, zones referred to as protected sections, intended to receive the fingerprint 2 or a metadata containing the fingerprint. For example, it is possible to use a language of opening and closing tags: the start of the protected section is identified by a specific sign such as "<<<" and the end by another specific sign such as ">>>".

Therefore, the language enabling the location of a protected section to be identified may be a markup language of marks and tags, such as "<<< . . . >>>", well-known and used for example by means of usual IT tools, in particular the regular expressions (regexp), the unix grep and sed programs, etc. This markup language may be an XML dialect such as a standardized markup language: for example "<protected-section> . . . </protected-section>".

The position of a protected section may also be determined, for example, according to the type of data block (document) considered, at the start or at the end of the data block. In this case, the fingerprint 2 is inserted neither at the start of the data block, nor after the end of the block, but after an opening tag or before a closing tag. The method 1, 1' may comprise initialization steps including marking the data block by inserting tags at one or more locations freely chosen.

It shall be noted that the data indicating the location and/or the length and/or the presentation parameters of a protected section may appear in the data block 4 outside the protected section. It shall be noted again that for certain types of binary documents, the insertion of a protected section into the data block 4 may be done so that the length of the text zone which contains it remains unchanged after inserting and replacing the fingerprint 2. In addition, the removal 101, 105 or replacement 101', 105' steps may involve replacing the entire protected zone, including the tags, or only the content between the tags.

In addition, depending on its type, the fingerprint 2 may itself provide information about the calculation or the calculation or encoding algorithm used to generate it. The fingerprint may also be associated with the name of the calculation algorithm used to generate the fingerprint, such as "md5", or "sha1", or the name of the encoding, such as "hex" (for hexadecimal), "b64" (for base 64), or "bubble-babble". In addition, the algorithm or encoding may be implicitly known since it is defined by default.

When the fingerprint 2 does not in itself indicate the type of calculation or calculation algorithm used to generate it, this information may be provided in a metadata inserted into the data block 4. If the fingerprint 2 is inserted into a metadata, this fingerprint calculation type information may be inserted into the same metadata as the fingerprint 2. The metadata containing the fingerprint calculation type information may also be inserted into a protected section as described above.

In a first embodiment of the method 1, 1', the fingerprint is produced by an irreversible function such as a hashing function.

In a second embodiment of the method 1, 1', the fingerprint 2 is inserted into the data block 4 as a digital signature generated by ciphering the fingerprint of the data block using a private key of a pair of public/private keys. The verification 102 of the digital signature may involve deciphering the signature with the public key of the pair of public/private keys, to obtain a deciphered fingerprint of the data block, and verifying that the deciphered fingerprint corresponds to the one calculated from the modified data block 6 from which the fingerprint 2 has been removed in the removal 101 or replacement 101' step. It shall be noted that the fingerprint 2 may also be a signature calculated by ciphering the data block directly, with the private key, rather than a fingerprint of the data block. In this case, the signature may be verified by deciphering the signature using the corresponding public key and by comparing the deciphered data block thus obtained with the modified data block.

In one or other of these two embodiments, one or more metadata 2 contained in the data block 4 may provide the parameters necessary for the verification. These parameters may indicate the type of algorithm used to generate the fingerprint and/or the signature. In the second embodiment, these parameters may provide the email address of a "gpg" signer, and the corresponding public key. According to one embodiment, one of these metadata may contain a piece of information not removed during the removal 101, 105 or replacement 101', 105' steps. For example, it may be specified that the email address of a signer of a data block must not be removed, which prevents the data block from being signed by another person if the data block is referenced by its signature by other data blocks, without modifying these other data blocks.

According to one embodiment, a reference metadata inserted into the data block contains the fingerprint or the signature of another data block, so as to establish a reference link with this other data block. If the reference metadata is inserted into the data block before the calculation and insertion of the fingerprint into the data block performed in steps 108, 108', 116, 116', the reference link thus established cannot be modified without corrupting the data block containing the reference metadata. This reference link may be used for example to establish reliable links between a data block and previous versions of this data block.

According to one embodiment, certain metadata are eligible for the removal (or the replacement) performed in steps 101, 101', 105, 105', and others are not eligible for removal. Therefore, the identification metadata containing the fingerprint of the block is eligible for removal. The reference metadata not to be modified or the authenticity of which must be ensured are not eligible for removal. They are thus taken into account in the fingerprint calculation performed in steps 102 and 114. Furthermore, by providing reference metadata eligible for removal, it is possible in a data block to reference future versions of the data block or of the data blocks containing complementary information, without having to update the data block identification fingerprint.

Generally speaking, such reference metadata, whether eligible for removal or not, enable relationships or referencing between data blocks to be managed. In particular, this means enables relations between versions of a same data block or between different data blocks to be defined, and these relations may be used by a program.

It is also understood that certain metadata may not require any verification due to their purely informative nature (a date, references to external documents not controlled such as external documentation sources). These metadata may then be configured to be eligible for removal. For example, it may be desirable to insert into a data block a reference to a particularly useful document, a date of reading, the name of a reader, etc., without having to update the fingerprint of the data block 4. It is thus possible to insert into a data block arbitrary information (i.e. not calculated from the content) without modifying the value of the identification fingerprint identifying the data block 4, depending on the content of the latter.

More particularly, present-day technology does not enable data block relationships to be managed, particularly by causing a data block or digital file to indisputably reference its previous versions, and to reference its future versions or complementary documents without its fingerprint being modified. The method 1, 1' enables the previous versions of a digital file to be referenced by incorporating reference metadata each containing the identification fingerprint of another file or enabling said fingerprint to be determined. If a reference metadata is eligible for removal, it is possible to modify it without having to update the fingerprint of the data block containing this reference metadata.

Therefore, according to one embodiment, the method 1, 1' comprises an additional step executed between step 105, 105' and step 106, or after step 108, 108', to insert into the data block 2 as reference the fingerprint that has been removed in step 105, 105'. If the reference fingerprint is thus inserted before step 106 of calculating the new identification fingerprint, the reference fingerprint is not eligible for removal and thus indisputably references the previous version of the data block (identified by the fingerprint removed in step 105, 105'). If, on the contrary, the reference fingerprint is inserted into the data block after the calculation step 106, it is eligible for removal to be able to verify the integrity of the data block (steps 100-103). The result is that this reference fingerprint may be modified without introducing any inconsistency between the fingerprint of the data block and the identification fingerprint identifying the data block inserted in step 108, 108'.

Similarly, present-day technology does not enable a data block having a given identification fingerprint to be distinguished from those referring to it. According to one embodiment, the method 1, 1' implements several distinct operations of encoding a same fingerprint to distinguish in a same data block an identification fingerprint identifying the data block from a reference fingerprint referring to another data block. In this way, a data block fingerprint may be used as key word either to search for a data block identified by the fingerprint, or to search for data blocks referring to the data block identified by the fingerprint. Therefore, a data block found from its fingerprint or from a reference fingerprint referring to another data block, is identified for certain in the results of a search.

According to the example presented above, in which the metadata 2 identifying a data block 4 includes a fingerprint "sha1" having a hexadecimal format of 40 characters, the data blocks referring to this data block identified by this fingerprint integrate a metadata including for example the following variation of the fingerprint:

"3_13579888a840dec517a3908d57427299ec1f5f7", where the insertion of the character "_" in position 1 indicates that this is a fingerprint referring to another data block rather than a fingerprint identifying the data block. Therefore, the occurrences of this type of variation will not be located by the regular expression of searching for the identification fingerprint (not modified) and thus cannot come into conflict with the identification fingerprints that are not in reference metadata.

The fingerprint 2 may further depend on contextual information and/or information external to the data block 4, so that it is not possible to modify such contextual or external information without changing the fingerprint of the data block. For example, the calculation of the fingerprint 2 may take account of a file name comprising the data block or of a portion of this file name, so that it is not possible to modify it.

Furthermore, indexing and search engines do not currently have the possibility of identifying data blocks by their content in a certain and unambiguous manner, in particular without using any dictionaries or other specific archiving services. Indeed, via present-day search and indexing engines, it is not possible to find precise information in a fast and unambiguous manner, as it is not provided to find a data block directly from its fingerprint again. Due to the naturally ambiguous nature of key words coming from a natural or technical language as currently used, and to their use in a growing background noise, direct searches for precise documents are complex and often hampered by the priority criteria of search engines. Of course, it is currently possible to insert a fingerprint into the file name to index it, and to find this file during a search again. However, this method has several disadvantages, in particular, the impossibility of prohibiting any change to this name by a third party and/or the difficulty managing documents whose name contains their own fingerprint.

In relation to these problems, the method 1, 1' advantageously provides that all or part of a fingerprint 2 be used as key word of a search engine so as to enable a data block 4 to be searched for from the fingerprint 2 it contains. This fingerprint may for example have the form of a long, non-natural string of characters that is very difficult to falsify (such a falsification attempt is referred to as "preimage" attack). Furthermore, this string of characters cannot be produced by chance or if so, according to infinitesimal probabilities. Such a search can thus only send back identical copies of a given data block.

According to one embodiment, the method 1, 1' (steps 110 to 116 or to 116') is executed several times to insert into a data block 4 not only one, but as many fingerprints or signatures as desired. Adding a new fingerprint may, in certain conditions, not change the values of the fingerprints 2 previously integrated to the data block. This is for example the case when inserting the new fingerprint into a new protected section juxtaposed to a protected section previously inserted into the data block, and if all the protected sections containing a fingerprint are removed 101, 101' 105, 105' during the verification and insertion of a fingerprint, and each fingerprint may correspond to the fingerprint of the initial data block, i.e. free from these additions of protected sections. The fingerprints thus inserted into the data block may have been calculated by different types of calculation.

According to another embodiment, steps (a) (110, 114, 116 or 110, 112, 114, 116') are executed several times in cascade on a data block. Therefore, each execution of the steps (a) introduces into the data block a new fingerprint identifying the data block, calculated on the data block as it is at the start of each new execution of the steps (a).

By thus enabling several identification fingerprints to be inserted into a data block in cascade, the method 1, 1' thus provides, in addition to the possibility of using calculation algorithms already known to be resistant, strong protection against preimage attacks by combining several fingerprints or signatures in a same data block 4. Indeed, to be successful, a preimage attack must produce a data block which not only possesses exactly and all the same fingerprints, but which can also be validly taken for the original data block (a zip archive, an executable java source, etc.). This attack is already very difficult to do when there is only one fingerprint to be forged, and becomes totally impossible with known technologies when several fingerprints are combined.

The choice of fingerprint formats (number of characters for example) and encoding (hexadecimal, b64, bubble babble for example) enables in particular the manner in which the document may be indexed by means of the fingerprints or signatures to be defined. For example, in the "bubble babble" format, a fingerprint has the form of independent 5-letter words that can be understood and memorized by a human being. In the hexadecimal format, the fingerprints are longer, using only all the figures and the letters from A to F. The "b64" format uses all the characters, in capital and small letters.

According to one embodiment, the metadata comprise an invariable part and a variable part, and only the variable part of a metadata eligible for removal can be removed during the removal steps 101, 101', 105, 105'. By indicating the mode of calculation of the fingerprint 2 in the invariable part of the identification metadata, it is possible to impose the mode of calculation of the fingerprint, and thus to prohibit the creation of other identical data blocks at the end of the removal step 101, 101', 105, 105', and having different fingerprints.

Present-day technology does not enable any program to exploit via its own code its various certification keys or those of associated programs. Indeed, such information is provided, as applicable, in files separate from source files of the program, and may thus be corrupted by a third party, and accessible by means of tricks. Therefore, one embodiment relates to a computer program product comprising portions of program file saved on a computer-readable medium, to implement the steps of the method 1, 1', the computer program product constituting all or part of the data block 4 or being distributed over several data blocks. By enabling fingerprints of data blocks to be put under the control of the programmer, it is possible for example to set a variable such as a string of characters of the program to the value of the fingerprint of a data block belonging to a file containing all or part of the program. Therefore, the method 1, 1' may offer a program an immediate access to its identification fingerprint.

The computer program product thus modified is itself signed and authenticated and is above all capable of self-checking. The method 1, 1' thus makes it possible to certify that data blocks are not corrupted, to search for and index these data blocks based on their fingerprints (for example "sha1") by usual search engines, and to link the data blocks together by references to the fingerprints, while making it possible for search engines to distinguish the copies of a data block that are identified by their fingerprint from those that refer to it.

Concerning the possible deployments of the method 1, 1':
it can be made available to end users for each hardware platform, so as to be used for example very simply by a drag-and-drop operation,
it can be integrated or called by existing software (Internet browsers, compilers) so as to automate the validation of and search for documents,
it can be made available to users via a Web site or a Web service.

One embodiment relates to a computer program designed to process data blocks containing multiple occurrences of fingerprints and/or signatures calculated by varied algorithms presented according to varied encoding operations such as, for example: i) a fingerprint "md5" with 32 hexadecimal characters, ii) a fingerprint "sha1" with 40 hexadecimal characters, iii) the same fingerprint in "bubble babble", iv) a "gpg" signature, i.e.:
i) 11a3e229084349bc25d97e29393ced1d,
ii) 313579888a840dec517a3908d57427299ec1f5f7,
iii) xesef-havem-midim-gafuv-sugul-piveb-mahul-ginad-nilys-catuz-loxix, and
iv) 88460400110200060502503e355e000a0910205d6d cf987e18306913009f6524a79b328f506a8bb6228a09a1a3c 3b19713f6009f6a17805128a2919a65459047f323 57493eb0 a913.

The program locates these fingerprints for example by means of regular expressions such as "[0-9a-f]{40}", and performs the same processing operations as previously, i.e. removal of the identification fingerprints and metadata eligible for removal 101, 101' or 105, 105', fingerprint calculation 102, 106, 114, fingerprint verification 103 or fingerprint insertion 108, 108', 116, 116'. Other means of distinguishing a data block having a fingerprint from those referring to it can be imagined. The "bubble babble" version of the same fingerprint may indeed be calculated from the hexadecimal encoding. Reference can thus be made to the data block by using the "sha1" fingerprint, and searches for the data block can be done using the fingerprint in "bubble babble". The insertion of a signature into the data block enables the author of the signature and the date of signature to be identified. The robustness of the protection offered by the fingerprints against preimage attacks can be increased by inserting in cascade into the data block several fingerprints calculated by distinct algorithms.

Any other embodiment may also be considered that relies on a language defining the metadata or protected sections and which characterizes their content. For example and without limitation, another set of metadata may be considered:

i) #11a3e229084349bc25d97e29393ced1d#,
ii) <zp sha1 hex 40 11a3e229084349bc25d97e29393ced1d/zp>, i.e. a "sha1" fingerprint with 40 hexadecimal characters,
iii) {MTV5iIqEDex sha1 hex 8 11a3e229}, i.e. a truncated "sha1" fingerprint with 8 hexadecimal characters,
iv) [zp signer abc.defgh@gmail.com], i.e. the signer of the data block,
v) &zp 200 end&, i.e. the definition of a protected zone in the last 200 characters of the data block from which the information describing the content and the location of the protected zone can be extracted, and
vi) <zp freemeta next version is dcf987e18306913009f6524a79b3/zp>, i.e. a protected zone (eligible for removal (101, 101', 105, 105') containing text freely edited by a user, for example to refer to a document produced in future, without changing the value of the fingerprints.

According to one embodiment, specific link data blocks are exclusively generated to establish a link between two other data blocks, without having to modify either one of these two data blocks to insert thereinto, for reference, the fingerprint of the other of these two data blocks. In addition to its own identification fingerprint, each link data block contains the identification fingerprints of several other data blocks as reference fingerprints. The link data blocks enable links to be established between data blocks without having to modify the latter, thus without modifying their identification fingerprints. The reference fingerprints and the link data blocks constitute structuring elements enabling a set of data blocks to be structured, in which each data block is directly or indirectly linked with several other data blocks. Therefore, if one of the data blocks is modified and if the reference links are part of the data not eligible for removal, it loses all its direct and indirect links (through a link block) with the other data blocks.

Figure 9:
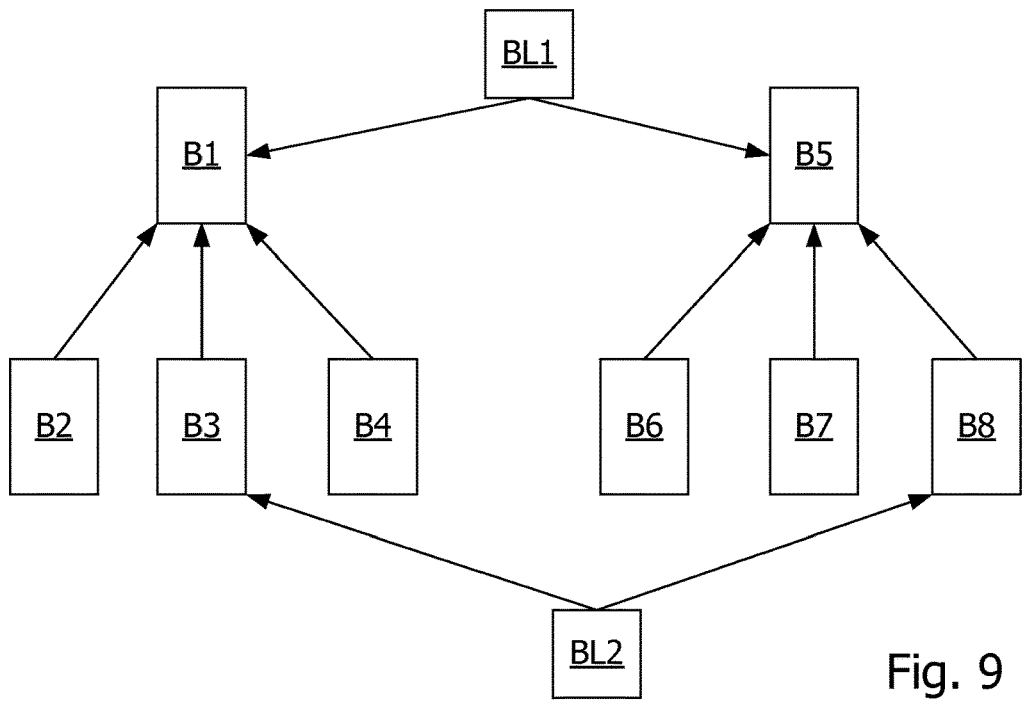
FIGS. 9 and 10 represent examples of structured sets of data blocks.

FIG. 9 represents one example of a set of data blocks B1 to B8 each linked to one or more other data blocks, and in which each arrow symbolizes a reference link in a data block (original block of the arrow) with another block (destination block of the arrow). In the example in FIG. 9, the blocks B2, B3 and B4 contain the fingerprint of the block B1 as reference and the blocks B6, B7 and B8 contain the fingerprint of the block B5 as reference. In addition, the set of data blocks comprises link data blocks BL1, BL2 respectively establishing a link between the data blocks B1 and B5 and a link between the data blocks B3 and B8.

Figure 10:
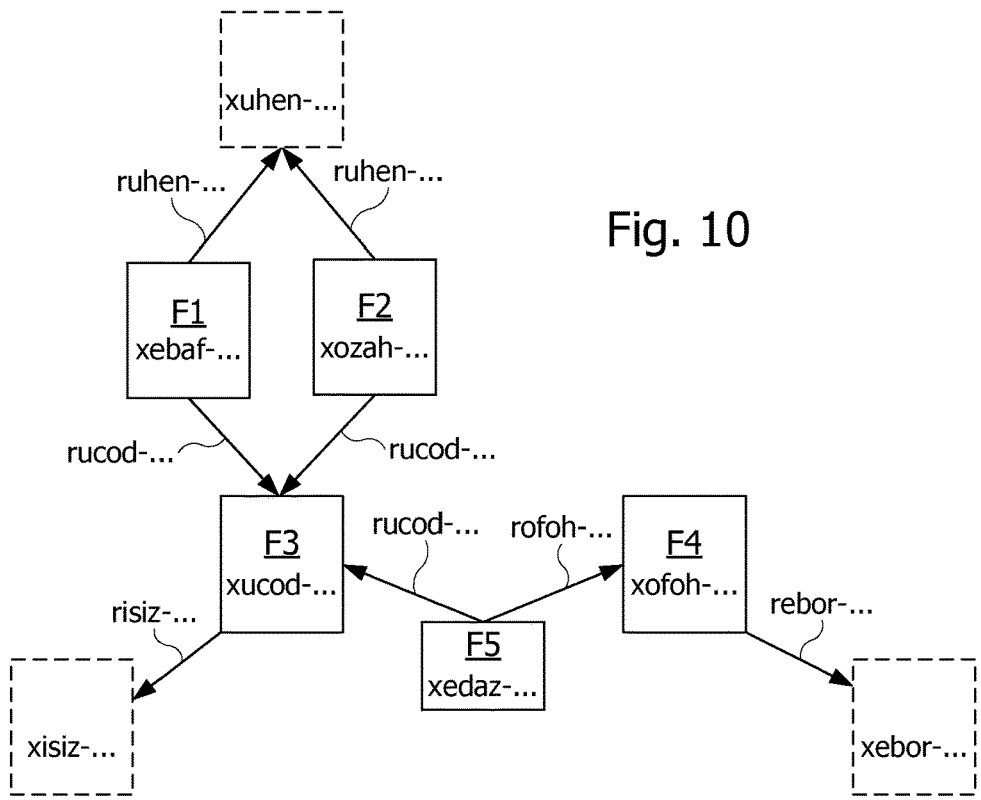

FIG. 10 represents a set of files F1 to F5 linked to each other by reference links. Appendix I provides the content of the metadata of each of the files F1 to F5. In each of the files F1 to F5, the metadata are inserted into a protected section delimited by the opening "/*" and closing tags "*/". Each metadata is located and delimited between the key words "keeex" and "xeeek". The fingerprints are coded in the "bubble babble" format. The identification fingerprints start and end with the letter "x" and are introduced by the key word "self". The reference fingerprints start and end with the letter "r" and are introduced by the key word "ref". Therefore, an identification fingerprint can be deduced from a reference fingerprint merely by changing the first and last letters "r" of the fingerprint with the letter "x" and vice versa. The reference links associating two reference fingerprints (file F5) are introduced by the key word "ref2". The files F1 and F2 refer to the file F3 and to another file identified by the fingerprint:

"xuhen-zakid-kakas-mased-hedot-faded-tamap-rulem-porib-cihit-vicif-fazuh-kisit-tycat-gypaf-dymag-raxux".

The file F3 refers to another file identified by the fingerprint:
"xisiz-kynov-mogec-tycas-livaf-hytov-cyzar-hofed-no-byl-zuvyz-mifav-kiteb-nodun-mipyr-bilac-ceheh-zyxyx"

The file F4 refers to another file identified by the fingerprint:
"xebor-movab-vyzif-tisaz-hurev-vuzys-vohyk-kyfaz-pe-hih-dygik-zukuv-zulek-fobyk-vedug-banal-sylin-muxax"

The file F5 is a link block establishing a reference link between the files F3 and F4. Upon the removal step 101, 101' during a verification of one of the files F1 to F5, only the identification fingerprint located by the key word "self" is removed from the file. The files F1 to F5 comprise another metadata "name" enabling a name to be allocated to the file and to be specified in the body of the file. The file F3 comprises a metadata "prop" whereby it is possible to define a property of the file, of the "description" type in the example provided.

It should be obvious for those skilled in the art that this invention is susceptible of embodiments in many other specific forms without moving away from the field of application of the present invention as claimed. As a result, the present embodiments must be taken as illustrations, but may be modified in the field defined by the scope of the appended claims.

For the operations of verifying and updating a data block, it is obviously not necessary to generate a modified data block from which the identification fingerprint has been removed. Indeed, the fingerprint calculation can be carried out on the data block by excluding on-the-fly the bits of the identification fingerprint contained in the data block.

Furthermore, fingerprint calculation modes other than those described may be considered. For example, the fingerprint calculations may be performed by a data compression function with no information loss, such that the fingerprint calculation is a reversible operation. The fingerprint calculations may also be performed by a data compression function with loss, but rendering the reconstitution of a data block from its fingerprint possible. The calculation function may for example combine a function of transformation into a bitmap image, and a bitmap image compression function with loss. A data block may be reconstituted from its fingerprint by decompressing the image, and by converting the image into alphanumeric characters by an OCR function.

---

APPENDIX I (being an integral part of the description)

File F1
/*
keeex self xebaf-zuzat-zocut-telyc-bycyn-talyd-nukak-senom-lufyr-mipaz-
   gulab-kacep-kilid-pobin-bekub-tyvib-koxix xeeek
keeex name "Name1" xeeek
keeex ref "ruhen-zakid-kakas-mased-hedot-faded-tamap-rulem-porib-cihit- APPENDIX I (being an integral part of the description)

```
                    vicif-fazuh-kisit-tycat-gypaf-dymag-raxur" xeeek
keeex ref "rucod-pibev-mehog-puhuc-vypiz-donom-bocet-vymyc-retyz-
        gyfam-damul-hanud-dikav-fulyg-cuvez-ligyb-hexor" xeeek
*/
File F2
/*
keeex self xozah-lydeg-vymap-nopop-decec-zuvod-zufof-pikav-halut-dycyt-
            mogit-kofer-bipaf-nimib-benef-mefeh-nyxux xeeek
keeex name "Name2" xeeek
keeex ref "ruhen-zakid-kakas-mased-hedot-faded-tamap-rulem-porib-cihit-
                vicif-fazuh-kisit-tycat-gypaf-dymag-raxur" xeeek
keeex ref "rucod-pibev-mehog-puhuc-vypiz-donom-bocet-vymyc-retyz-
        gyfam-damul-hanud-dikav-fulyg-cuvez-ligyb-hexor" xeeek
*/
File F3
/*
keeex self xucod-pibev-mehog-puhuc-vypiz-donom-bocet-vymyc-retyz-
            gyfam-damul-hanud-dikav-fulyg-cuvez-ligyb-hexox xeeek
keeex name "Name3" xeeek
keeex ref "risiz-kynov-mogec-tycas-livaf-hytov-cyzar-hofed-nobyl-zuvyz-
            mifav-kiteb-nodun-mipyr-bilac-ceheh-zyxyr" xeeek
keeex prop "description", "xx xxxxx xx xx xxxx" xeeek
*/
File F4
/*
keeex self xofoh-hafuf-mybyg-fagas-fidec-cufov-malaf-lalof-bizyk-kapig-
            nyben-bymyb-ditug-zarud-hobaf-hikud-zixox xeeek
keeex name "name4" xeeek
keeex ref "rebor-movab-vyzif-tisaz-hurev-vuzys-vohyk-kyfaz-pehih-dygik-
            zukuv-zulek-fobyk-vedug-banal-sylin-muxar" xeeek
*/
File F5
/*
keeex self xedaz-harov-tifav-biguf-cobuh-pivyz-punyg-duguk-sisek-lohaz-
            gikot-rymoc-kirac-pytim-pimip-suhin-maxux xeeek
keeex name "name5" xeeek
keeex ref "ruriv-kypeh-sycir-rysyl-cadab-sapon-dynoz-fahan-zafiz-lenec-
            camym-tyrat-nihor-rugek-ryfuf-luged-hexyr" xeeek
keeex ref2 rucod-pibev-mehog-puhuc-vypiz-donom-bocet-vymyc-retyz-
            gyfam-damul-hanud-dikav-fulyg-cuvez-ligyb-hexor,
    "rofoh-hafuf-mybyg-fagas-fidec-cufov-malaf-lalof-bizyk-kapig-nyben-
                        bymyb-ditug-zarud-hobaf-hikud-zixor" xeeek
*/
```

The invention claimed is:

1. A method for generating a digital file having a verifiable integrity, comprising:
    searching for a location in an initial digital file for inserting freely-defined data having a data format independent from a file format of the initial digital file, while preserving the file format of the initial digital file,
    generating a modified file by inserting at a found location a data section comprising a first excluded part and a first mark for locating the first excluded part in the modified digital file, and the first excluded part including 0 bit or more, up to all bits of the data section,
    calculating a first digital fingerprint by applying a fingerprint calculation function to the modified digital file, the first digital fingerprint having a value depending on all bits of the modified file other than all bits of the first excluded part, and
    generating a first digital file by inserting the first digital fingerprint into the first excluded part in the modified file.

2. The method according to claim 1, wherein the calculation of the first digital fingerprint of the first digital file comprises replacing the first excluded part with predefined data in the first digital file, the value of the first digital fingerprint depending on bits of the predefined data.

3. The method according to claim 1, wherein a plurality of digital fingerprints are inserted into the first digital file.

4. The method according to claim 1, further comprising:
    reading in the first digital file a second mark that identifies a location of a second excluded part in the first digital file, the value of the first digital fingerprint being independent from all bits of the second excluded part.

5. The method according to claim 3, wherein at least one of the plurality of fingerprints is computed from bits of another one of the plurality of fingerprints present in the first digital file.

6. The method according to claim 1, wherein the first digital file includes a reference link formed from a second digital fingerprint present in the first digital file and computed from a second digital file.

7. The method according to claim 6, wherein the reference link in the first digital file and the second digital fingerprint have distinct forms so as to distinguish the second digital fingerprint from the reference link.

8. The method according to claim 1, wherein at least one part of the first digital fingerprint present in the first digital file is encoded such that:
    (i) the at least one part is capable of being understood and memorized by a human, and
    (ii) a location of the first digital file is identifiable by an indexing engine or as a search key word by a search engine.

9. The method according to claim 1, wherein the first digital file is at least one part of an executable program, the first digital file including an instance of the first digital fingerprint at a location enabling the program to exploit the first digital fingerprint of the first digital file.

10. The method according to claim 1, wherein several instances of the first digital fingerprint are present in the first digital file in second excluded parts inserted into the first digital file outside the first excluded part, a value of the first digital fingerprint being independent from all bits of the second excluded part.

11. The method according to claim 1, wherein the first digital fingerprint present in the first digital file is a digital signature generated by an asymmetric cryptographic calculation using a private key of a pair of public/private keys, a fingerprint verification comprising deciphering the digital signature found in the first digital file, with a public key of the pair of public/private keys.

12. The method according to claim 6, wherein the second digital fingerprint present in the second digital file is at least partly determinable from the reference link present in the first digital file.

13. The method according to claim 1, further comprising:
locating the first mark in the first digital file,
locating the first excluded part in the first digital file based on the first mark,
calculating a second digital fingerprint by applying the fingerprint calculation function to the first digital file, the second digital fingerprint having a value depending on all bits of the first digital file, other than all bits of the first excluded part in the first digital file, and
verifying the integrity of the first digital file by comparing the second digital fingerprint with the first digital fingerprint in the excluded part.

14. The method according to claim 1, further comprising:
modifying data of the initial digital file in the first digital file,
locating the first mark in the first digital file,
locating the excluded part in the first digital file based on the first mark,
calculating a second digital fingerprint by applying a fingerprint calculation function to the first digital file, the second digital fingerprint having a value depending on all bits of the first digital file, other than all bits of the first excluded part in the first digital file, and
replacing the first digital fingerprint by the second digital fingerprint in the first excluded part.

15. The method according to claim 1, wherein the first file includes a second excluded part, the first digital fingerprint being calculated from each of the bits of the first file other than all the bits of the first and second excluded parts in the first file.

16. A non-transitory computer-readable storage medium storing machine-executable instructions that, when executed by one or more processors, cause the one or more processors to:
search for a location for inserting data into an initial digital file,
generate a modified digital file by inserting, at a found location in the initial digital file, a data section having a first excluded part and a first mark representing a location the first excluded part in the modified digital file, and the first excluded part including 0 bit or more, up to all bits of the data section,
calculate a first digital fingerprint by applying a fingerprint calculation function to the modified digital file, the first digital fingerprint having a value depending on all bits of the modified digital file other than all bits of the first excluded part, and
generate a first digital file by inserting the first digital fingerprint into the first excluded part in the modified file.

17. The computer-readable storage medium according to claim 16, wherein at least one part of the machine-executable instructions is included in the first digital file.

18. A computer file system comprising:
a set of digital files stored in at least one non-transitory computer-readable storage medium, and
a processor configured to generate each digital file of the digital file set from an initial digital file by:
searching for a location in the initial digital file for inserting freely-defined data having a format independent from a format of the initial digital file, while preserving the format of the initial digital file,
generating a modified digital file by inserting at a found location into the initial digital file a data section comprising a first excluded part and a mark to locate the first excluded part in the modified digital file, and the first excluded part including 0 bit or more, up to all bits of the data section,
calculating an identification fingerprint identifying the modified digital file, the identification fingerprint having a value depending on all bits of the modified digital file other than all bits of the first excluded part, and
generating a verifiable first digital file by inserting the identification fingerprint into the first excluded part in the modified file.

19. The file system according to claim 18, further comprising:
a first digital file including a reference link formed from an identification fingerprint present in a second digital file of the file system.

20. The file system according to claim 18, further comprising:
a link digital file containing two reference links formed from identification fingerprints present respectively in two other digital files of the file system to establish a link between the two other digital files.

21. The computer-readable storage medium according to claim 16, further storing machine-executable instructions that, when executed by one or more processors, cause the one or more processors to:
insert the second digital fingerprint into the first excluded part.

22. The computer-readable storage medium according to claim 16, further storing machine-executable instructions that, when executed by one or more processors, cause the one or more processors to:
modify data of the initial digital file in the first digital file,
locate the first mark in the first digital file,
locate the first excluded part in the first digital file using the first mark,
calculate a second digital fingerprint by applying a fingerprint calculation function to the first digital file, the second digital fingerprint having a value depending on all bits of the first digital file, other than all bits of the first excluded part in the first digital file, and
replace the first digital fingerprint by the second digital fingerprint in the first excluded part.

23. A computer file system comprising:
a set of digital files stored in at least one non-transitory computer-readable storage medium, each digital file of the digital file set including:
a data section including a first excluded part and a first mark representing a location of the first excluded part in the digital file, the data section being in a location in the digital file where freely-defined data having a format independent from a format of the digital file can be inserted while preserving the format of the digital file, and the first excluded part including 0 bit or more, up to all bits of the data section, an identification fingerprint identifying the digital file, in the first excluded part, the identification fingerprint being computed by applying a fingerprint calculation function to all bits of the digital file, other than all bits of the excluded part.

* * * * *